United States Patent
Hansen

(10) Patent No.: US 7,070,730 B2
(45) Date of Patent: Jul. 4, 2006

(54) METHOD OF MANUFACTURING FOAM CORE BOAT COLLARS

(75) Inventor: William M. Hansen, Port Orchard, WA (US)

(73) Assignee: Safe Boats International, LLC, Port Orchard, WA (US)

( * ) Notice: Subject to any disclaimer, the term of this patent is extended or adjusted under 35 U.S.C. 154(b) by 254 days.

(21) Appl. No.: 10/462,088

(22) Filed: Jun. 13, 2003

(65) Prior Publication Data
US 2004/0250402 A1    Dec. 16, 2004

(51) Int. Cl.
*B29C 67/20*    (2006.01)

(52) U.S. Cl. ................ 264/321; 29/446; 52/438

(58) Field of Classification Search ......... 264/46.4, 264/46.5, 46.6, 46.9, 321; 29/446; 53/438
See application file for complete search history.

(56) References Cited

U.S. PATENT DOCUMENTS

| | | | |
|---|---|---|---|
| 3,853,334 A | | 12/1974 | Auman et al. |
| 3,935,690 A | * | 2/1976 | Lea et al. ............... 53/397 |
| 4,372,028 A | * | 2/1983 | Clark et al. ............. 29/460 |
| 4,518,448 A | * | 5/1985 | Henry et al. ............. 156/86 |
| 4,841,713 A | | 6/1989 | Beier |
| 4,901,676 A | | 2/1990 | Nelson |
| 4,973,438 A | * | 11/1990 | Gaudreau ............. 264/45.7 |
| 5,213,728 A | * | 5/1993 | Hickman ............. 264/46.9 |
| 5,868,980 A | * | 2/1999 | Brandon ............. 264/45.2 |
| 5,878,685 A | | 3/1999 | Hemphill et al. |
| 6,331,131 B1 | | 12/2001 | Selevan |

* cited by examiner

*Primary Examiner*—Allan R. Kuhns

(74) *Attorney, Agent, or Firm*—Christensen O'Connor Johnson Kindness PLLC

(57) ABSTRACT

A method for fabricating foam cored items in which the foam core is tightly encased by an outer shell. The method is particularly suited for fabricating foam collars that are located above the chine of a boat and extend longitudinally along the sides of the boat to provide stabilization for the boat during high performance maneuvering and/or provide a fendering system.

25 Claims, No Drawings

METHOD OF MANUFACTURING FOAM CORE BOAT COLLARS

FIELD OF THE INVENTION

This invention generally relates to a method for manufacturing items that include a relatively flexible shell-like sleeve that tightly encapsulates a core of expanded polymeric foam material. The invention is particularly suitable for and directed to the manufacture of foam core collars that serve as boat sponsons or fenders.

BACKGROUND OF THE INVENTION

Plastic foam material manufactured by expanding polymeric beads of polyethylene, polypropylene and polyurethane is used in a variety of situations. In some situations, finished products are formed by, for example, casting or molding the polymeric material in the presence of a blowing agent. In other cases, sheets or a block of foam are molded or otherwise formed that can be used for protective packaging or for additional processing by machining or other techniques that result in a desired product or product component. Advantageously, the process used to form the foam material and foam products can be controlled to establish a relatively wide density range. Further, the foam material and products exhibit a number of desirable properties such as relatively high energy absorption, resistance to denting or scarring caused by impact, light weight and resistance to chemicals and other substances. However, situations exist in which it is necessary or desirable to either coat the exterior of an item formed of expanded polymeric plastic foam with protective material to form a shell-like skin layer or to encase the foam with a relatively flexible sleeve formed of fabric that is coated or impregnated with protective material. Applying a protective coating to the exterior of an item formed of expanded polymeric plastic foam is somewhat disadvantageous in that several additional manufacturing steps are often required to obtain the desired protective coating. For example, it may be necessary or desirable to sequently coat the foam item with different types of material. Typically, each coat must be allowed to cure or dry prior to proceeding with additional steps of a manufacturing process. On the other hand, encasing an item formed of expanded polymeric plastic foam with a protective sleeve can result in problems from the standpoint of serviceability, appearance and performance unless the sleeve is placed under tension so that the sleeve is of a uniform, desired contour and shape.

Among the situations in which polymeric plastic foam material is either coated with protective material or is located within a protective sleeve is the fabrication of foam members commonly called collars that are affixed to the external surfaces of boat hulls to serve as stabilizers or fenders. By way of example, U.S. Pat. Nos. 5,282,436, 5,647,297 and 5,870,965 issued to Hansen, incorporated herein in their entirety by this reference, disclose high performance boats that are stabilized through the use of polymeric foam stabilizers. In the arrangement of Hansen, the foam stabilizers are mounted on the sides of the hull above the chine and extend from stern to bow. The foam stabilizers of the Hansen patents are not in contact with the water when the boat is at rest or is being operated at cruising speed. However, when the boat lists during high speed turns, the stabilizers enter the water and provide a righting moment that decreases list relative to what would otherwise be present. Although the stabilizers used in the Hansen patents are preferably formed from a foam such as closed cell polypropylene or polyethylene that does not absorb water and exhibits fair resistance to dents and chemicals, increased damage tolerance and tolerance to sunlight can be achieved by coating the exterior of the foam stabilizers with a protective material.

Examples of boat collars that employ sleeves that contain polymeric foam material include published U.S. patent application Ser. No. 20020096101 of Hansen and U.S. Pat. No. 6,371,040 to Hemphill et al., (each of which are hereby incorporated by reference). Although the Hansen patent application and the Hemphill et al. patent differ in several aspects, the arrangements disclosed in both of these references employ a cylindrical sleeve that is similar to conventional inflatable flotation collars and is only partially filled with expanded polymeric foam. More specifically, the polymeric foam used in the arrangement of Hemphill et al. is tubular, circumferentially surrounding and encasing an inflatable air bladder. In the Hansen patent application, polymeric foam inserts are employed that do not completely fill the sleeve with inflatable air bladders being located in regions of the sleeve that do not contain the foam inserts. In both the Hemphill et al. and Hansen arrangements, the air bladders are inflated to place the sleeve under tension to thereby provide a collar of desired shape, contour and firmness.

The solid foam boat collars described in the Hansen patents and the partially foam filled collars described in the Hemphill et al. patent and the Hansen patent application all function satisfactorily from the standpoint of stabilizing a boat and/or providing a fendering system. Nonetheless, a need exists for boat collars that incorporate the structural simplicity, ruggedness and durability of solid foam collars while simultaneously presenting advantages from the standpoint of ease of fabrication and the efficient manufacture and repair of foam collared boats.

SUMMARY OF THE INVENTION

In its most general aspect, the invention provides a method for fabricating items of manufacture in which polymeric foam that defines the size and shape of the item is firmly encased by a shell-like skin layer. In accordance with the invention, the encased foam is formed of a compressible polymeric foam material that returns to its original shape and volume when compressive forces are removed. One step of the method of the invention includes casting or machining the foam material so that it corresponds in shape and contour to the manufactured item, with the cast or machined foam being larger than the finished item of manufacture. The cast or machined foam is then compressed so that its size and volume is less than that of the item being manufactured. While in the compressed state, the foam is inserted into a relatively flexible shell or sleeve that corresponds to the shape and size of the item being manufactured. The opening that allows placement of the foam in the shell is then closed. Because the shell does not allow the foam to totally return to its original size, the shell is placed under tension to tightly enclose the foam. By suitably selecting the density of the foam and the degree to which the fully expanded foam is oversize, a desired degree of rigidity can be attained.

In the specific application of the invention for manufacturing foam boat collars, the relatively flexible sleeve is tubular and is fabricated from fabric such as woven or knitted polyester and/or nylon coated with polyurethane or polyurethane blended with polyvinylchloride (pvc). Synthetic rubbers such as cholorosulifonated polyethylene (commonly identified by the trademark "Hypalon") may also be used. Regardless of the material employed, the tubular sleeve is dimensioned and shaped to match the contour of the boat on which the collar is to be mounted and, in addition, to define a desired cross-sectional geometry (e.g., round, oval, or "D" shaped). To allow placement of foam within the tubular sleeve, an opening extends along the perimeter of the sleeve. Preferably, the opening is either equipped with a single zipper or two zippers that are sewn or thermally welded one on top of the other and operated by a common opening and closing pull.

Polymeric foam that matches the shape of the collar being manufactured, but is dimensionally larger than the interior of the tubular sleeve is then compressed, and while in the compressed state is placed inside the tubular sleeve. In many cases, sections of compressed foam are placed in abutment with one another along each side of the tubular sleeve so that the foam can easily be inserted in the sleeve, especially with respect to sleeve regions that are curved or angled to match hull shape.

Once the compressed foam is appropriately situated in the tubular sleeve, the zipper or other arrangement used to access the interior of the sleeve is closed and the foam is allowed to expand. In that regard, the degree of oversize to which the foam was originally fabricated does not allow the foam to fully expand. Specifically, the expanding foam presses against the tubular sleeve placing it under tension. Since the tubular sleeve exhibits limited stretching or flexure, the foam remains under compression. As a result, a collar fabricated in accordance with the invention exhibits physical properties such as energy absorption, and resistance to dents, dings, and chemicals that match or surpass the corresponding physical properties of prior art boat collars.

DETAILED DESCRIPTION

The invention will now be described as it specifically relates to the fabrication of foam collar stabilization and fendering systems for boats. Upon understanding the use of the invention in that particular context, those skilled in the art will recognize that the invention can be employed to fabricate other items that primarily consist of a polymeric foam core that is encased by or coated with a protective and/or decorative skin layer. Use of the invention can be especially advantageous as an alternative to prior art processes in which multiple steps are used to coat an item formed of polymeric foam in order to provide a reinforced skin layer.

Regardless of whether the item being fabricated is a foam boat collar or another item, the invention basically comprises four primary operations. The first operation is the fabrication of a relatively flexible sleeve or shell that, at the end of the process, will define the object's size and shape and will fully enclose a foam core. The fabricated sleeve or shell includes an opening that allows access to the interior of the sleeve or shell and is of sufficient size to allow placement of the polymeric foam in the sleeve or shell. A zipper or other means of closing the opening is also included.

The second operation is forming (e.g., casting or machining) the polymeric foam that is to be enclosed by the sleeve or shell. The type of foam to be used is selected on the basis of the desired weight of the item being manufactured (i.e., determined by foam density and object size), impact resistance, and other physical properties of the foam that are specified by the manufacturers that supply polymeric foams. In all cases, the foam that is used in the practice of the invention is compressible and exhibits a "memory" that restores the foam to its original shape and size (within at least a few percent) when the compressive force is removed. Further, regardless of the technique used to form the polymeric foam material, the foam core that results from the forming operation corresponds to the shape of the object that is being fabricated, but is dimensionally larger.

The third operation is compressing of the foam core for insertion in the interior of the sleeve or shell. In the current practice of the invention, the foam core (or individual foam sections that can be assembled to make up the core) is compressed using one of two techniques. First, in fabricating objects such as foam collars that are of substantially circular or other smooth and uniform cross-sectional geometry, a mechanical compression technique may be used. Specifically, polycarbonate sheeting or other suitable material is wrapped about the periphery of the foam object with edges of the sheeting overlapping with one another and with the sheeting extending over at least the full length of the foam object. A series of ratchet equipped tensioning straps or other similar devices are placed over the sheeting at spaced-apart locations along the length of the formed foam core. The straps or equivalent devices are then sequentially tightened to compress the foam by the desired amount, with the sheeting protecting the surface of the foam core and distributing the compressive force that results by tightening the straps. In some cases, such as large foam cores and/or relatively dense foam, it may be necessary to tighten the tension straps in stages, pausing between stages to allow the foam to reach the state of then caused by the tension straps.

As an alternative to mechanical compression, the formed foam object is compressed by inserting it in a conventional hyperbaric chamber and increasing the air pressure within the chamber to achieve the desired amount of compression. Use of the hyperbaric chamber is especially advantageous in situations in which the foam core is small or is of irregular geometry that does not provide a smooth and uniform surface that is easily compressed by means of mechanical compression.

Once the formed foam is in the desired state of compression, the fourth operation is placing it in the interior of the sleeve or shell. The zipper or other arrangement allowing access to the interior of the sleeve or shell is used to close off the interior of the sleeve or shell. As the compressed foam expands, its outer surface contacts the interior surface of the sleeve or shell. As expansion of the foam continues, the sleeve or shell is placed under tension that is sufficient to cause the outer surface of the sleeve or shell to be uniform and of the desired shape and contour.

Turning specifically to the fabrication of foam boat collars, the sleeve or shell that encloses the foam core is constructed of material such as a woven or knitted polyester and/or nylon fabric that is coated with polyurethane or polyurethane that is blended with polyvinylchloride (pvc). Synthetic rubbers may also be used such as chlorosulfonated polyethylene, which is commonly identified by the trademark "HYPALON." As will be recognized by those skilled in the arts relating to boat collars, the same types of material are used in the construction of inflatable floatation collars. Each of these materials is relatively flexible within the context of the present invention. That is, when the inner surface of a sleeve or shell formed of the material is placed under tension by the encased polymeric foam, the outer surface of the sleeve becomes firm and assumes the desired size and shape.

With respect to foam boat collars, the tubular sleeve is dimensioned and shaped to match the contour of the boat on which the collar is to be mounted. Currently, design work has been completed or is under way to produce foam collars for boats ranging in length from approximately ten feet up to approximately fifty feet. With respect to cross-sectional geometry, the designs that have been completed or are under way utilize both "D" shaped sponsons like those disclosed in the previously referenced Hansen patents and sponsons of circular cross-section as disclosed in the previously referenced Hansen patent application and the Hemphill et al. patent. The preferred width or diameter of the tubular collar ranges from approximately eight inches for smaller boats up to approximately thirty-six inches for the largest boats. Similarly, the weight of the material used to form the tubular sleeve varies according to boat size and the use for which the boat is designed (e.g., recreational, commercial, etc.). Material suitable for use in the manner in which the invention will be initially practiced range between what is known as twenty ounce material and fifty ounce material. In extremely demanding situations, even heavier material (e.g., up to ninety ounce) can be used.

The way the tubular sleeve is fabricated from the selected material is substantially the same as the way inflatable floatation collars are manufactured. That is, the fabric is cut in accordance with a pattern for the boat on which the collar is to be used and the patterned pieces of fabric are thermally welded or otherwise bonded together. To allow access to the interior of the tubular shell for placement of the foam, an opening is included along the perimeter of the tubular shell. In the currently preferred practice of the invention, a zipper is sewn into the opening. Most preferably, and especially with respect to large foam collars, a double-zipper configuration is used in which two zippers are sewn together, one on top of the other with a single conventional tabular zipper pull being used to open and close both zippers simultaneously.

With respect to polymeric foam for use in fabricating a boat collar in accordance with the invention, the use of closed cell polypropylene and polyethylene material is preferred since objects formed of that material can be compressed and when no longer subjected to compressive forces will return to their original state typically having no more than two percent residual compression. Further, polypropylene and polyethylene foam materials exhibit very low water absorption, thus remaining buoyant even under circumstances where the sleeve of a foam collar has been damaged. The density of the foam material generally is selected as a tradeoff between collar buoyancy (low density foam) and resistance to impact during maneuvers such as docking (higher density foam). This tradeoff is affected by both the size and intended use of the boat employing the foam collar. Currently, the practice of the invention can use foams having densities ranging from approximately 0.05 pounds per cubic foot to 5 pounds per cubic foot, thus allowing a high degree of design latitude. By way of example and not limitation, a foam density of 1 pound per cubic foot has been used in fabricating a foam collar for a 25 foot boat with the diameter of the sponsons being 21½ inches. With further regard to selecting an appropriate foam material, reference may be taken to ASTM 3575, which is entitled "Structural Properties of Plastics" and is published by the American Society for Testing and Materials. That publication is used by the manufacturers of polymeric foam material to determine and publish material properties that are important to the design of foam collars including material density, buoyancy, tensile and tear strength as well as the degree to which an item formed of the foam will return to its original shape and size after being compressed.

Although it is possible to cast or mold the polymeric foam for use in small boat collars, the foam material is machined to a shape that matches the expanded interior shape of the tubular sleeve (i.e., the shape of the collar being made). As mentioned with respect to the tubular sleeve, the cross-sectional geometry typically used for boat collars is circular or "D" shaped. Regardless of the exact cross-sectional geometry, the cross-sectional dimensions of the foam core that is constructed of the foam material exceed the corresponding dimensions of the interior of the tubular sleeve. For example, with reference to the previously mentioned collars for a 25 foot boat, the interior diameter of the sleeve (when fully expanded) is 21½ inches, an uncompressed diameter of the foam core is 23 inches. At this point in time, an appropriate "rule of thumb" appears to an unexpanded foam core size that is oversized by approximately eight percent.

With continued reference to the foam core, it sometimes is necessary to fabricate the core in sections that are not as long as one side of the collar being produced. Specifically, the curvature or tangential angle of the boat hull near the bow of the boat or other areas may require the use of shorter sections of foam that are placed in the tubular shell in lengthwise abutment with one another. In such cases, it can be advantageous to dimension the foam sections slightly longer than required so that lengthwise expansion of the sections within the sleeve will press the sections together and tension the tubular shell in the longitudinal direction. By way of example, with respect to the foam core used in the fabrication of a collar for a 25 foot boat, foam sections having an intended final length of 24 inches were 24½ inches prior to being compressed and placed in the tubular sleeve.

Compressing the foam core or core sections for placement in the tubular shell is accomplished by the previously discussed mechanical means or the use of a hyperbaric chamber. With respect to foam collars having a circular or "D" cross-sectional shape, the use of the mechanical compression technique may be more advantageous than compression in a hyperbaric chamber. In that regard, the compressed foam core sections can be stored with the tensioning belts maintaining the foam cores under compression, thus allowing efficient production scheduling and in the case of relatively large foam collars, the ability to process the number of foam core sections required to completely fill the tubular sleeve. Preferably, the degree to which the foam cores are compressed is determined by the density of the foam, the ease of compressing the foam and the expansion rate of the foam once the compressive force is no longer present. In particular, the minimum amount of compression must allow time for the foam to be placed in the tubular sleeve and, additionally, should be established so that the time required for the foam to expand within the tubular sleeve is of reasonable length. With reference to the exemplary situation of fabricating a foam collar for a 25 foot boat, the foam core is formed so that it is approximately eight percent oversize relative to the diameter of the foam collar, core is compressed to eighty-two percent of its original size.

In the final steps of fabricating the foam collar, one or more sections of foam core that are needed to fill the tubular sleeve are placed in the sleeve, the sleeve is closed by means of the zipper and the foam is allowed to expand. As previously noted, the interior volume of the tubular sleeve does not allow the foam core to fully expand so that the tubular sleeve of the foam collar is placed under tension.

While the invention has been described in terms of its currently preferred implementation, it will be appreciated that various changes can be made therein without departing from the spirit and scope of the invention.

The embodiments of the invention in which an exclusive property or privilege is claimed are defined as follows:

1. A method of fabricating an item of manufacture of a type in which a sleeve encompasses and firmly surrounds polymeric foam material, said method comprising the steps of:
   (a) forming a sleeve having a shape and size that corresponds to the item of manufacture, said sleeve having an interior for receiving said polymeric foam material and having an opening that allows placement of said polymeric foam in said interior of said sleeve;
   (b) fabricating one or more inserts for placement in said interior of said sleeve, said one or more inserts being formed of compressible polymeric foam, having a shape that corresponds to the shape defined by said interior of said sleeve and being oversized relative to said interior of said sleeve;
   (c) compressing said one or more foam inserts to a size less than the size of said interior of said sleeve;
   (d) placing the compressed foam inserts in said interior of said sleeve;
   (e) closing said opening of said sleeve; and
   (f) expanding the compressed polymeric foam inserts so that the expanded foam inserts bear firmly against at least the majority of said interior of said sleeve to cause said sleeve to fully encompass and firmly surround the polymeric foam;
   wherein said step of compressing said one or more foam inserts includes the steps of inserting said inserts in a hyperbaric chamber and increasing the atmospheric pressure in the hyperbaric chamber until the size of said one or more inserts is less than the size of said interior of said sleeve and are small enough to allow placement in said interior of said sleeve.

2. The method of claim 1 wherein said inserts are formed from a compressible polypropylene foam.

3. The method of claim 2 wherein the density of said polypropylene is within a range of approximately 0.05 pounds per cubic foot to approximately 5.0 pounds per cubic foot.

4. The method of claim 3 wherein said step of forming the sleeve includes the step of installing a zipper for allowing access to and sealing off of said interior of said sleeve.

5. The method of claim 1 wherein said inserts are formed from compressible polyethylene foam.

6. The method of claim 5 wherein the density of said polyethylene is within a range of approximately 0.05 pounds per cubic foot to approximately 5.0 pounds per cubic foot.

7. The method of claim 6 wherein said step of forming the sleeve includes the step of installing a zipper for allowing access to and sealing off said interior of said sleeve.

8. The method of claim 1 wherein said inserts are formed from a compressible polypropylene foam.

9. The method of claim 8 wherein the density of said polypropylene is within a range of approximately 0.05 pounds per cubic foot to approximately 5.0 pounds per cubic foot.

10. The method of claim 1 wherein said step of compressing said one or more foam inserts includes the steps of surrounding peripheral regions of said inserts with tensioning belts and tightening the tensioning belts to compress said polymeric foam to a size less than the size of said interior of said sleeve.

11. The method of claim 10 wherein said inserts are formed from compressible polyethylene foam.

12. The method of claim 11 wherein the density of said polypropylene is within a range of approximately 0.05 pounds per cubic foot to approximately 5.0 pounds per cubic foot.

13. A method of fabricating a boat collar of the type that extends outwardly from the hull of the boat and is of a predetermined cross-sectional geometry, said method comprising the steps of:
   (a) forming a tube-like sleeve having a shape and size that corresponds to that of the boat collar, said sleeve having an interior region of cross-sectional geometry that substantially corresponds to the cross-sectional geometry of the boat collar and an opening for accessing said interior region of said sleeve, said opening being equipped with a closure for selectively allowing access to said interior region of said sleeve and for selectively closing off said interior region of said sleeve;
   (b) fabricating one or more inserts for placement in said interior region of said sleeve, said one or more inserts being formed of compressible polymeric foam having a cross-sectional geometry that substantially corresponds to the cross-sectional geometry of said interior region of said sleeve, but is oversized relative thereto;
   (c) compressing said one or more of said inserts to a point at which said one or more inserts can be positioned in said interior region of said sleeve;
   (d) placing the compressed foam inserts in said interior region of said sleeve;
   (e) operating said closure to close off said interior region of said sleeve; and
   (f) expanding the compressed polymeric foam inserts so that the expanded foam inserts fill said interior region of said sleeve without reaching a fully expanded state.

14. The method of claim 13 wherein said inserts are formed from a compressible polypropylene foam.

15. The method of claim 14 wherein the density of said polypropylene is within a range of approximately 0.05 pounds per cubic foot to approximately 5.0 pounds per cubic foot.

16. The method of claim 15 wherein said step of forming the sleeve includes the step of installing a zipper as said closure for allowing access to and sealing off said interior region of said sleeve.

17. The method of claim 13 wherein said inserts are formed from compressible polyethylene foam.

18. The method of claim 17 wherein the density of said polyethylene is within a range of approximately 0.05 pounds per cubic foot to approximately 5.0 pounds per cubic foot.

19. The method of claim 18 wherein said step of forming the sleeve includes the step of installing a zipper as said closure for allowing access to and sealing off said interior region of said sleeve.

20. The method of claim 13 wherein said step of compressing said one or more inserts includes the steps of inserting said inserts in a hyperbaric chamber and increasing the atmospheric pressure in the hyperbaric chamber until said one or more inserts are compressed to a degree that allows said one or more inserts to be positioned in said interior region of said sleeve.

21. The method of claim 20 wherein said inserts are formed from a compressible polypropylene foam.

22. The method of claim 21 wherein the density of said polypropylene is within a range of approximately 0.05 pounds per cubic foot to approximately 5.0 pounds per cubic foot.

23. The method of claim 13 wherein said step of compressing said one or more inserts includes the steps of surrounding peripheral regions of said inserts with tensioning belts and tightening the tensioning belts to compress said polymeric foam to a degree that allows said one or more inserts to be positioned in said interior region of said sleeve.

24. The method of claim 23 wherein said inserts are formed from compressible polyethylene foam.

25. The method of claim 24 wherein the density of said polypropylene is within a range of approximately 0.05 pounds per cubic foot to approximately 5.0 pounds per cubic foot.

* * * * *